United States Patent [19]
Creyke

[11] Patent Number: 5,628,372
[45] Date of Patent: May 13, 1997

[54] LAND MANAGEMENT APPARATUS FOR CREATING IRRIGATION POOLS

[76] Inventor: Charles H. Creyke, Baldersby Park, Topcliffe, Thirsk, North Yorkshire, United Kingdom, Y073BZ

[21] Appl. No.: 256,757

[22] PCT Filed: Nov. 23, 1993

[86] PCT No.: PCT/GB93/02411

§ 371 Date: Aug. 29, 1994

§ 102(e) Date: Aug. 29, 1994

[87] PCT Pub. No.: WO94/12010

PCT Pub. Date: Jun. 9, 1994

[30] Foreign Application Priority Data

Nov. 24, 1992 [GB] United Kingdom ............... 9224555

[51] Int. Cl.$^6$ ........................................ A01B 35/28
[52] U.S. Cl. ................... 172/534; 172/519; 172/537; 172/173; 172/177; 172/741
[58] Field of Search ........................ 172/534, 535, 172/519, 537, 532, 170, 173, 177, 119, 604, 741; 301/53, 43; 152/324

[56] References Cited

U.S. PATENT DOCUMENTS

| | | | |
|---|---|---|---|
| 1,190,601 | 7/1916 | Smith | 172/532 |
| 1,250,570 | 12/1917 | Dunham | 172/537 |
| 1,291,772 | 1/1919 | Currier | 172/549 |
| 1,304,871 | 5/1919 | Garst | 172/177 |
| 1,402,947 | 1/1922 | Myers | 152/324 |
| 1,477,089 | 12/1923 | Towner | 172/501 |
| 1,714,852 | 5/1929 | Denitson | 172/549 |
| 2,029,872 | 2/1936 | Johnson | 55/30 |
| 2,146,222 | 2/1939 | Pace | 172/540 |
| 2,966,948 | 1/1961 | Ulsh | 172/532 |
| 3,207,234 | 9/1965 | Stewart | 172/519 |
| 3,297,096 | 1/1967 | Wooldridge | 172/537 |
| 3,822,655 | 7/1974 | Benedict et al. | 172/604 X |
| 3,998,275 | 12/1976 | Eisenhardt | 172/519 X |
| 4,102,406 | 7/1978 | Orthman | 172/177 X |
| 4,164,190 | 8/1979 | Newman | 172/537 X |
| 4,508,177 | 4/1985 | Wiser | 172/177 |
| 4,611,668 | 9/1986 | Hrubes | 172/549 X |
| 4,844,174 | 7/1989 | Zimmerman | 172/177 X |
| 4,932,477 | 6/1990 | Atwood | 172/519 |

FOREIGN PATENT DOCUMENTS

| | | |
|---|---|---|
| 373467 | 6/1990 | European Pat. Off. . |
| 379672 | 8/1990 | European Pat. Off. . |
| 2179843 | 11/1973 | France . |
| 320589 | 1/1972 | U.S.S.R. . |
| 316739 | 8/1929 | United Kingdom . |

OTHER PUBLICATIONS

Massey Ferguson MF440 Row Crop Cultivator Brochure.
International Row Crop Cultivators and Rotary Hoes, International Harvester Brochure.

*Primary Examiner*—Terry Lee Melius
*Assistant Examiner*—Victor Batson
*Attorney, Agent, or Firm*—Galgano & Burke

[57] ABSTRACT

The invention concerns an apparatus which is both land and roadworthy and which is for use in land management. The apparatus comprises wheel or drum members on which it travels which members are provided with friction free or self-cleaning ridges which when travelling over land provide an impression of a kind which safeguards against soil erosion and improves land irrigation.

14 Claims, 7 Drawing Sheets

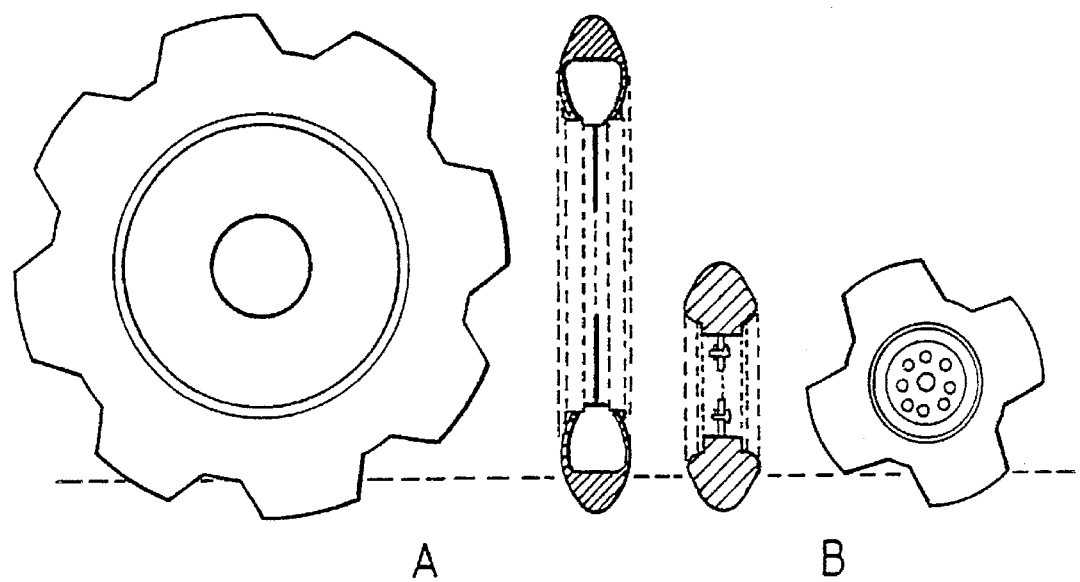
Fig. 3
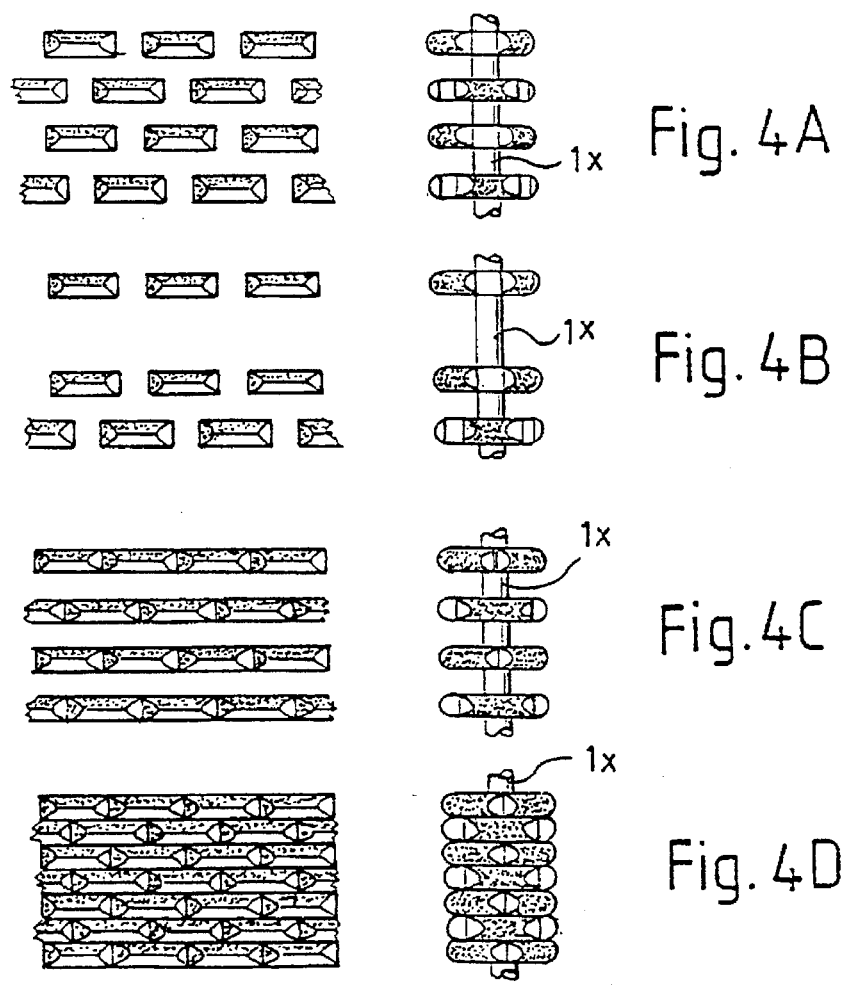
Fig. 4A
Fig. 4B
Fig. 4C
Fig. 4D

LAND MANAGEMENT APPARATUS FOR CREATING IRRIGATION POOLS

The invention relates to land management and in particular to an apparatus for use in managing soil irrigation.

Agricultural production techniques typically involve the ploughing, cultivating, harrowing, sewing, rolling, inversion, stirring and compacting of land. These activities are undertaken with the intention of obtaining maximum crop yield at minimum cost per acre of cultivatable land. However, such practices have created problems. These problems include soil surface erosion and difficulties in ensuring uniform soil irrigation.

I have therefore produced a unique and relatively light weight means, compared to conventional agricultural equipment, for manipulating a loose bare soil surface. This means enables the profile and texture of the soil surface to be transformed so as to minimize against soil erosion and to provide for uniform soil surface irrigation. Further, the means is propelled using land management rollers that can travel either on agricultural land or road and when used on land these rollers have self-cleaning properties. In addition, the nature and number of said rollers can be modified according to a user's requirements.

According to a first aspect of the invention there is therefore provided a land and roadworthy apparatus for use in land management comprising a driving means for moving the apparatus over land or along a road; and at least one wheel or drum member on which said apparatus, at least in part, travels, which member is adapted to be friction free or self-cleaning when travelling on said land and further includes a plurality of spaced peripheral ridge members; whereby movement of the apparatus over land creates a series of land impressions corresponding to the nature and number of ridge members of the apparatus for the purpose of preventing soil erosion and ensuring uniform irrigation.

It therefore follows, that the ridge pattern on the said wheel or drum member will create a series of land impressions in the form of, preferably, equi-spaced land recesses, the result being that land thus treated will be fashioned in a manner which safeguards against erosion and further will be provided with a number of functional irrigation ditches so as to ensure that water (both rainfall and irrigation) retention across the land surface is substantially uniform. This latter advantage is essential where the precipitation rate is greater than the infiltration rate and/or the soil is lable to "capping".

These conditions can apply to any bare land which in the UK arable farmers' calendar amounts to:

77% of the calendar year for potatoes;
73% of the calendar year for spring cereals;
65% of the calendar year for sugar-beet; and
55% of the calendar year for autumn cereals.

In a preferred embodiment of the invention said wheel or drum member is mounted on at least one axle occupying at least one axis and means are provided so that the nature and number of wheel or drum members can be varied according to a user's requirements.

In a preferred embodiment of the invention the wheel member is adapted to be friction free by being of a resilient nature and ideally is made from a rubber material which may be fluid filled. Further, the wheel member may be a heavy duty and load bearing member, suitable for furrow presses, or alternatively, the wheel member may be smaller in diameter and of lighter construction and so less in weight, suitable for machines that are fitted by tractor three-part linkages, for example planters, drills, harrows, cultivators etc.

In addition, the resilient nature of the wheel member creates a situation where land treated by the apparatus in the invention is not compacted, in a traditional agricultural sense, but rather it is impressed. This has obvious advantages for crop cultivation.

Further, it is desirable that the number and nature of ridges are such that the recesses created represented 50–100% of the soil surface worked by the apparatus and ideally the size of the recesses are small relative to the size of conventional wheels or agricultural equipment so that such wheels are substantially supported, on a level plane, by the ground surrounding said recesses.

It will be understood that the shape of the recesses may be varied in accordance with requirement but ideally the opposite edges of adjacent ridges will be sloped and the angle of the slope may vary according to the nature of the land to be worked. For example, where a clay land is to be worked the angles of opposite edges on adjacent ridges will be acute. In contrast, where the apparatus is to work sandy land the angles of opposite edges on adjacent ridges will be less acute. This is because sandy land is less likely to retain the shape of the imprint of the apparatus and therefore to ensure that a successful impression is created the definition between adjacent recesses is less sharply defined by the provision of a more sloping divider.

In a yet further preferred embodiment the surface area of the upper outer most edge of the ridges represents approximately 50% of the circumferential area of the wheel member.

In yet a further preferred embodiment the upper outer most edge of each ridge is separated from an adjacent ridge by an area equal to the upper most area of the ridge.

It will be understood that an apparatus in accordance with the invention can be attached to conventional agricultural equipment and because of the wheel nature of the apparatus it is possible to use the apparatus not only to manage the land as afore described but also as a means for transporting conventional agricultural equipment and also as a depth determining device. Thus the apparatus may have three uses. This is, in part, because wheel members manufactured in accordance with the invention are both road and land worthy.

A further advantage to be gained from attaching apparatus in accordance with the invention to, for example, a plough lies in the fact that 100% of ploughed land can be pressed using this apparatus. This is in contra-distinction to conventional equipment where a furrow/land press, when attached to a conventional plough, is attached at an angle to the plough such that an area to one side of the plough is worked by the furrow or land press. As a result of this when a worker finishes ploughing and pressing an area of land there is always a strip of land immediately behind the plough which has yet to be furrowed or pressed. Attachment of apparatus in accordance with the invention to a conventional plough would overcome this difficulty because this apparatus could be positioned in rearward and aligned relationship with the plough so as to travel immediately behind the plough.

Further, because the apparatus can be attached to conventional agricultural equipment such as a vehicle it will always travel in the same direction of the said vehicle so eliminating the need for components that have to manipulate furrow or land presses which travel to a side of a vehicle.

The invention also has application in seed sowing or potato bed planting units since it is known that planting potatoes has brought serious soil erosion problems which can be solved by arranging for potatoes to be planted in land treated in accordance with the invention. Thus the attachment of an apparatus in accordance with the invention to a conventional potato planter achieves desirable results.

Similarly, attachment of an apparatus in accordance with the invention to a seed sowing apparatus is also advantageous in that it ensures that seeds are sown in land which can resist soil erosion and which is uniformly irrigated.

According to a further aspect of the invention there is therefore provided an agricultural apparatus or vehicle provided with at least one wheel member in accordance with the invention.

In order that a number of rows or columns of land impressions are created by the apparatus of the invention, we have also developed an apparatus which includes a plurality of wheel members. This apparatus ensures that rows of impressions are created as the apparatus travels over a predetermined area of land. Further, continuous working of a pre-selected region of land by driving of the apparatus backwards and forwards along the land in serpentine fashion results in an entire region of land being treated with an apparatus in accordance with the invention.

According to a yet further aspect of the invention there is therefore provided a land or roadworthy apparatus for use in land management comprising a driving member for moving the apparatus over the land and a plurality of wheel members as afore described and in accordance with the invention, wherein the wheel members are mounted in pairs, each pair on a single axle, and the ridges on opposite wheel members in a single pair are staggered with respect to each wheel member so as to facilitate turning of the wheel members.

It will be understood that each wheel member on this apparatus may be varied as afore described so as to ensure that the wheel member is suitable for working a given type of land.

Trials have shown that land treated with the above mentioned apparatus will retain the resultant impression for at least a winter and further that land thus treated will retain the impression for a sufficient amount of time to ensure favourable conditions for the rooting of seeds, after which time seed rooting further ensures stability of the land.

Apparatus in accordance with the invention will now be described by way of example only wherein:

FIG. 3 shows a side sectional view of alternative wheel members in accordance with the invention;

FIG. 4A, 4B, 4C and 4D show alternative land impressions in accordance with the invention;

Figure 1:
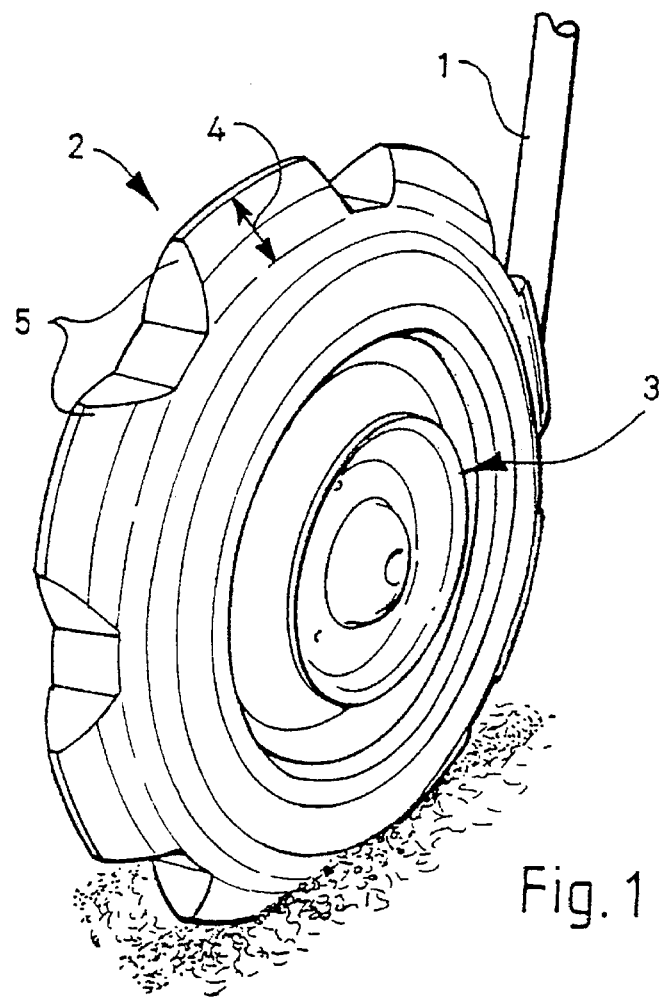
FIG. 1 shows a perspective view of an apparatus in accordance with the first aspect of the invention.

Turning to FIG. 1, there is illustrated a land management apparatus which comprises a driving member 1 which is adapted at its upper most end (not shown) to be manually or automatically driven by attaching same to a driving vehicle. Thus driving of the apparatus is effected by either an operator propelling the apparatus forward by holding the grip and pushing or by driving of the vehicle.

Member 1 is attached to a wheel member 2 on a further most side (not shown). Member 1 is attached to the hub 3 of wheel member 2 in conventional fashion.

Wheel member 2 includes an outer most, ground contacting rim region 4. Region 4 is provided with a number of equi-spaced and equi-shaped ridge members 5.

Figure 2:
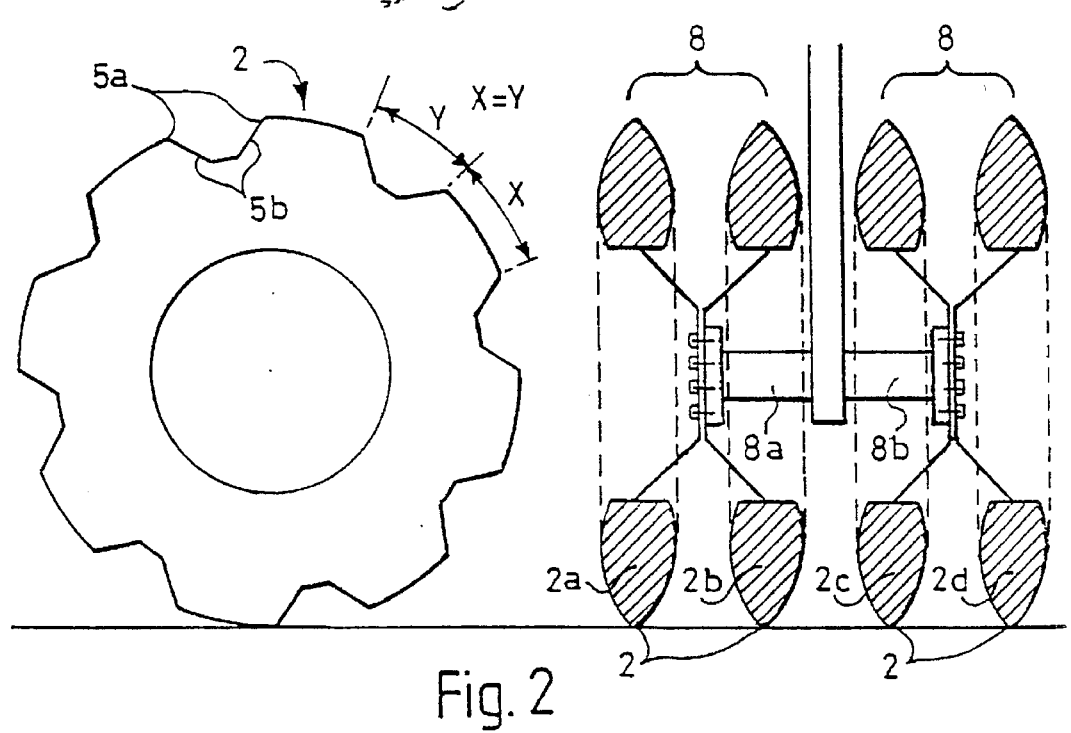
FIG. 2 shows a side elevation view of a part of the apparatus illustrated in FIG. 1.
Figure 5:
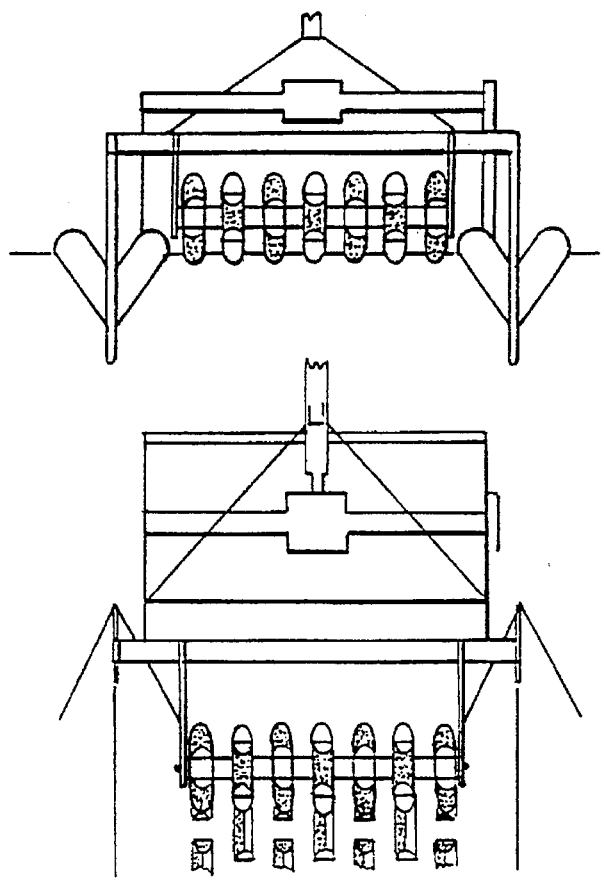
FIG. 5 shows a rotary bed former incorporating Type B recess forming wheels members.
Figure 6:
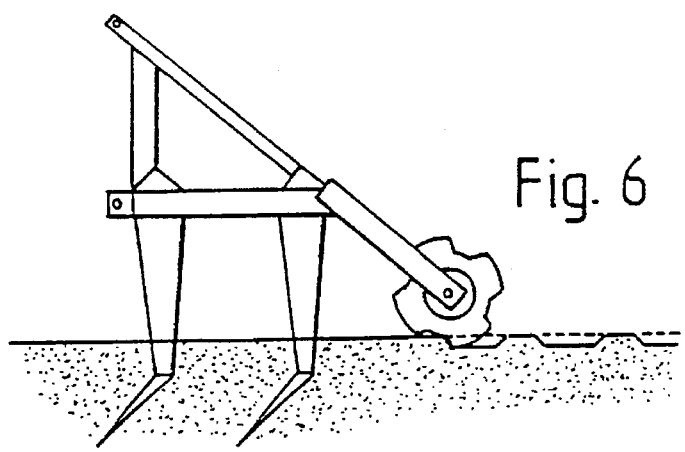
FIG. 6 shows a tined cultivator incorporating Type B recess forming wheel members.
Figure 7:
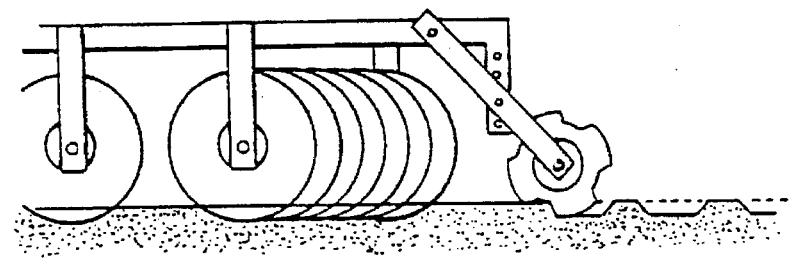
FIG. 7 shows a disc cultivator incorporating Type B recess forming wheel members.

A side elevation view of wheel member 2 is illustrated in FIG. 2.

To ensure that the impressions created by the wheel member are symmetrical, the shape of adjacent ridges is identical and the spacing between adjacent ridges is identical.

As can be seen, each ridge 5 includes an outer most edge 5a and side edges 5b. The angular slope of edges 5b can be varied according to the nature of land to be worked. For example, it is envisaged that clay based land, which is typically compressible, can be worked using side edges 5b which are relatively steep or acute. In contrast, sand based land which is typically difficult to mold into any predetermined shape and thus described as less compressible, will typically be worked using less steep or acute edges 5b.

Further, it can also be seen by reference to FIG. 2 that the area of surface 5a, shown in the diagram as "X", is generally equal to the area between adjacent edges 5a, shown as "Y" in the diagram. Thus 50% of the outer circumference of member 2 is provided with ridges 5.

Wheel member 2 is typically made of a rubber material which is fluid filled and ideally filled with gas such as air. Thus because the member is resilient it is relatively friction free insofar as soil does not cling to the member because its shape will change as it interacts with the soil surface. Further, it will be understood that because the member is filled with a fluid a fluid pressure of the member can be varied so as to vary the impressive force exerted by the member. A further advantage associated with the nature of the member lies in the fact that the member is both land and road worthy and therefore the member is at least dual purpose in that it can be used, when attached, to a conventional agricultural apparatus to not only work the land as afore described but further to also propel the apparatus along land and road.

FIG. 3 shows two alternative embodiments of a wheel member in accordance with the invention. The first Type A, shown on the left hand side of FIG. 3, is a relatively large pneumatic wheel made of a rubber material and ideally filled with air. This larger wheel is a heavy duty wheel suitable for a heavy load bearing apparatus such as a furrow press. In contrast, wheel member Type B, shown on the right hand side of FIG. 3, is a smaller version incorporating four cushioned or moulded pads which are covered with a suitable resilient and rubber material. This type of wheel is suitable for machines which are relatively light weight machines such as planters, drills, harrows and cultivators. In either case, the provision of an outer rubber and resilient material confers friction free or self-cleaning properties on the wheel. This property is advantageous for management of loose or non-compacted soils since it prevents such soils clinging to the wheels and preventing the wheels from performing their function.

Referring now to FIG. 4, a number of alternative land impressions are illustrated. The nature of the land impressions created are determined by, firstly, the number of wheel members provided on a single axle, secondly, the spacing between said wheel members and thirdly, the relative position of adjacent ridge members on adjacent wheels mounted said axle.

Referring firstly to FIG. 4A, it can be seen that four equi-spaced wheel members are mounted on axle 1x in a manner whereby adjacent ridge members are staggered. This produces a land impression comprising a number of rows of staggered recesses. In this instance, 45% of the land surface area is provided with recesses.

Referring now to FIG. 4B, three wheel members are mounted on a single axle and the spacing between said wheel members is variable. Moreover, the ridge members on two of the wheels are aligned and staggered with respect to the third wheel. This arrangement produces the land impression shown in FIG. 4B. The greater spacing between the upper most wheels creates a relatively broad strip of land which is ideal for the planting of root crops.

Referring now to FIG. 4C, there is shown an arrangement where 50% of the land area is recessed.

Referring now to FIG. 4D, there is shown an arrangement where 100% of the land area is recessed. This is achieved by the provision of a number of rollers on a single axle which rollers are mounted in contiguous fashion so that there is no spacing between adjacent rollers.

Any number of agricultural machines may be provided with an apparatus in accordance with the invention and FIGS. 5, 6, 7, 8, 9, 10 and 11 show various agricultural machines which are equipped with an axle on which there is mounted at least one wheel member in accordance with the invention.

Although the invention has been described with reference to a number of wheel members, the invention also includes the provision of a single drum member which is provided with ridge members positioned and spaced so as to impress land to be managed in accordance with a user's requirements.

Figure 12:
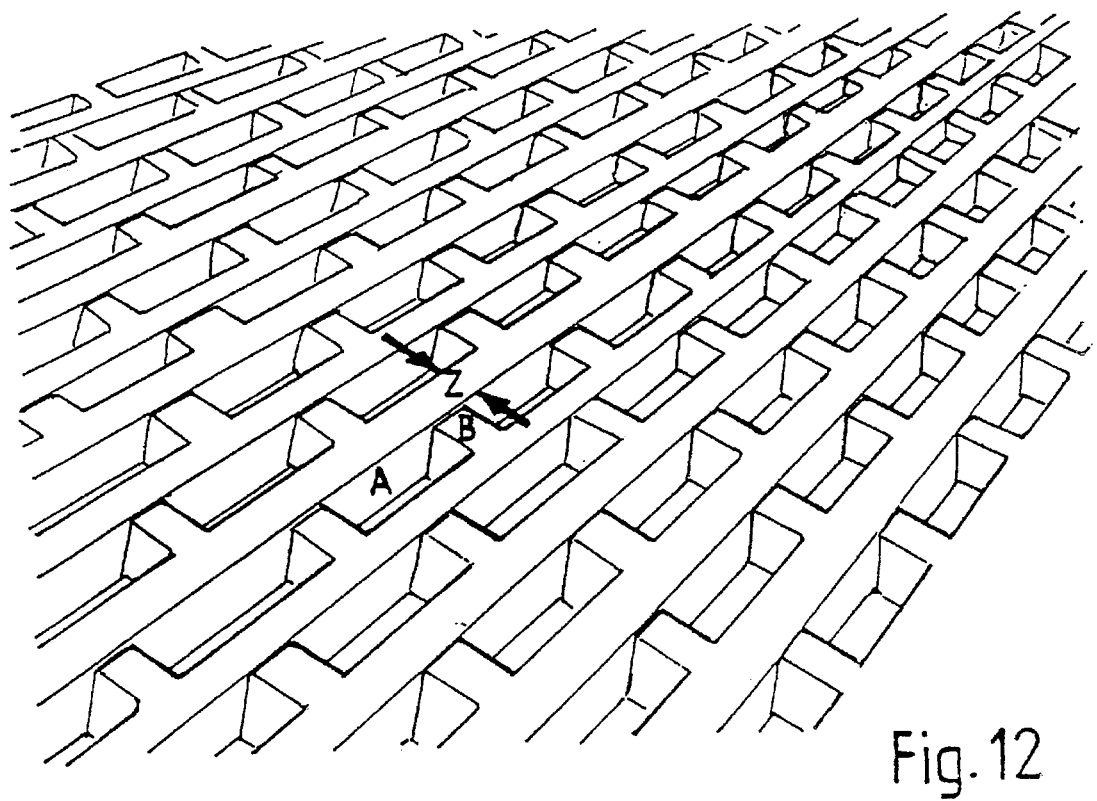
FIG. 12 shows a plan view of a region of land worked by the invention.

FIG. 12 shows an area of land which has been worked by an apparatus in accordance with the invention. The apparatus has a number of wheel members 2 mounted in aligned and adjacent relationship, further members 2 are spaced by an amount "Z" it can be seen that a uniform impression is created on the land which impression includes a series of adjacent recesses or ditch regions A, created by ridges 5, separated by wall members B, created by the spaces in between ridge members 5. Recesses A create ditches in which water can collect so as to ensure that water is retained in a relatively uniform fashion over the surface of the land. Further, the impressions created also ensure that soil erosion is reduced to a minimum.

As mentioned, the spacing "Z" between adjacent wheel members may be varied according to requirements.

Figure 8:
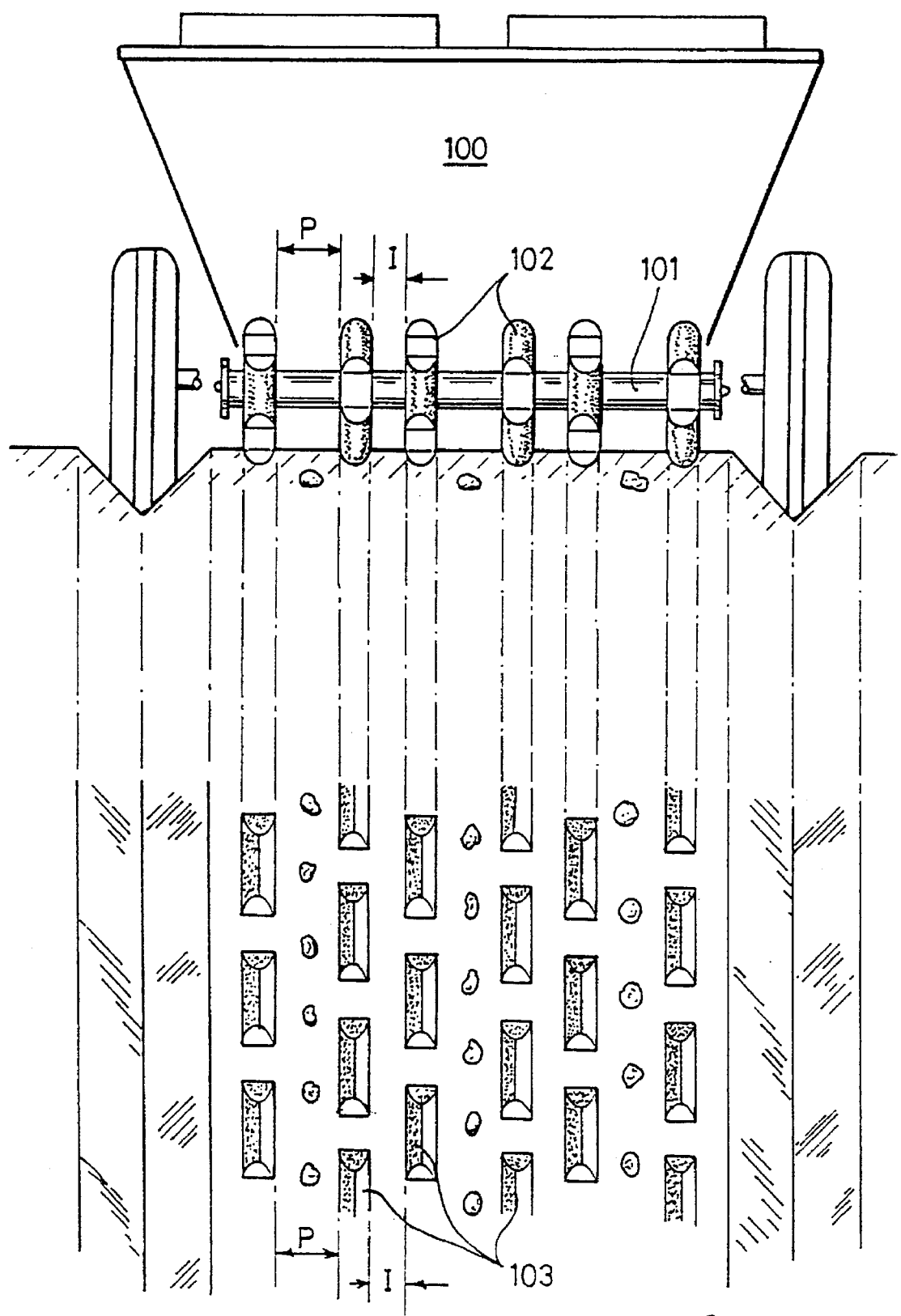
FIG. 8 shows a diagrammatic view of a potato planter modified in accordance with the invention.

Referring now to FIG. 8, there is illustrated a potato planter which has been modified in accordance with the invention. A hopper region 100 of a conventional potato planter is mounted adjacent a rotating axle 101 on which there is mounted a plurality of wheel members 102 in accordance with the invention. Rotation of axle 101 results in rotation of wheel members 102 such that a series of impressions 103 corresponding to the nature of wheel members 102 are created. It is of note that wheel members 102 are mounted clear of a potato exit of hopper 100 so that potatoes issuing from hopper 100 are deposited adjacent to a land impression and therefore adjacent to a functional irrigation ditch and soil erosion safeguard.

Figure 9:
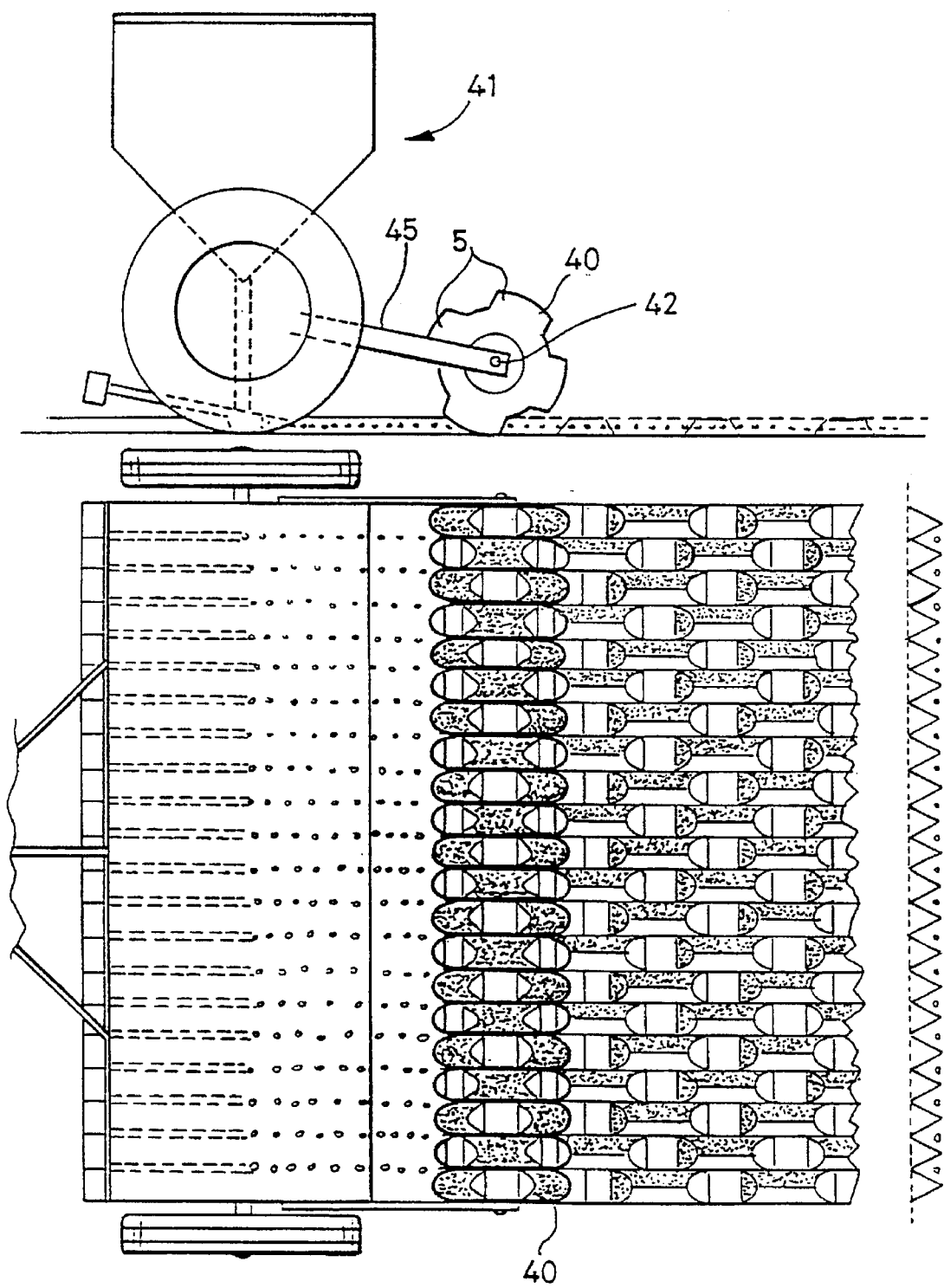
FIG. 9 shows a diagrammatic view of a seed sower modified in accordance with the invention.

Impressions 103 are provided in a staggered arrangement, however the provision of aligned impressions can be achieved by suitably mounting wheel members 102 on axle 101, and indeed such variations fall within the scope of the invention. Moreover, the spacing between adjacent wheel members, and so ridges, can be varied, as illustrated in FIG. 9, where, in this instance, a relatively large area of unimpressed strips are provided for potato planting "P" compared to impressed strips "T". This means that the number of wheel members 102 mounted on axle 101 can be varied.

Referring now to FIG. 9, it can be seen that a conventional seed sower 41 is provided with a coupler 45 to which is attached an axle 42 on which there is mounted a plurality of wheel members 40, which members 40 are arranged so that ridges 5 are staggered with respect to adjacent ridges 5 on neighbouring wheel members 40. Members 40 can be mounted either in front of, or rearward of, the direction of travel of the seed sower. It follows therefore that land either to be sown with seeds, or land already sown with seeds, is treated with members 40 so as to create impressed land that can uniformly retain rainfall over its face surface and also safeguard against soil erosion.

In the example shown in FIG. 9, members 40 are mounted rearward of the direction of travel of seed sower 41 and twenty one such members 40 are mounted in aligned and adjacent fashion having neighbouring ridges 5 on members 40 staggered with respect to each other.

Figure 10:
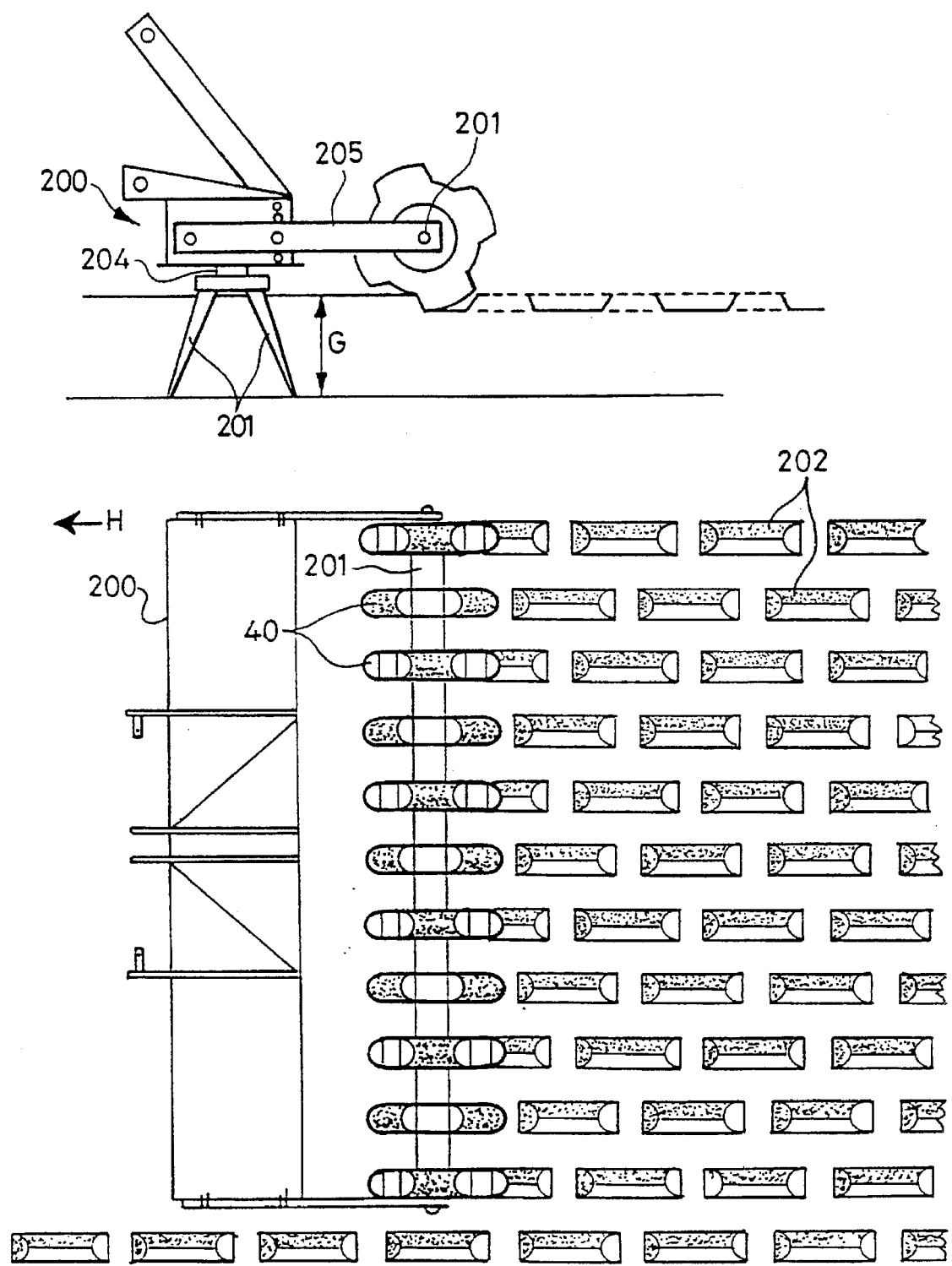
FIG. 10 shows a diagrammatic view of a power harrow modified in accordance with the invention.

Referring to FIG. 10, there is shown a conventional power harrow 200 including rotatable lines 201, mounted on vertical shaft 204, which lines rotate within a pre-determined depth of soil G to break up the soil for the purpose of land management.

Figure 11:
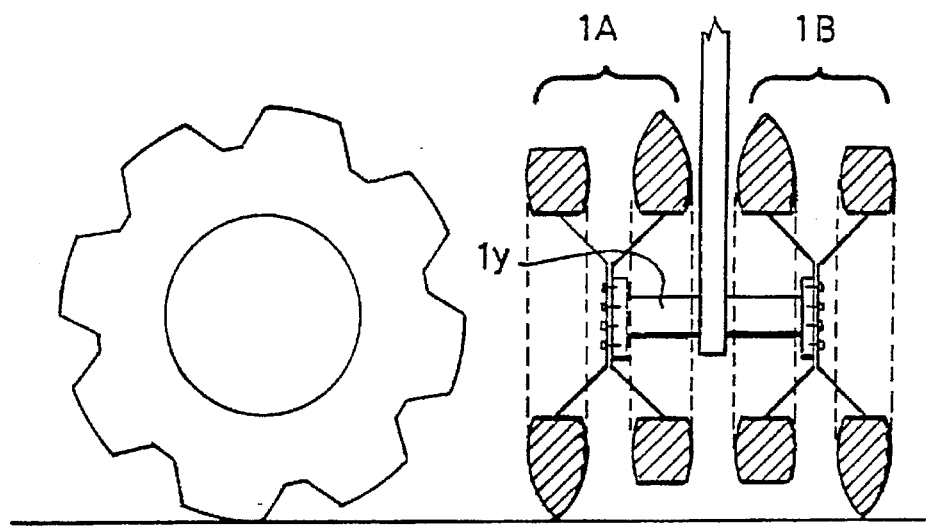
FIG. 11 shows an arrangement for mounting wheel members in accordance with the invention on an agricultural apparatus.

FIG. 11 shows an alternative way of mounting wheel members on an apparatus. In this arrangement, two pairs of wheels are mounted on a single axle 1Y using conventional mounting equipment. A first pair 1A are mounted on a first end of axis 1Y and a second pair 1B are mounted on a second end of axle 1Y. Within each pair 1A or 1B adjacent wheel members are mounted such that the ridges on each wheel are staggered with respect to each other. Further, in the example shown, the two inner most wheels are mounted so that the ridges on same are aligned. However, it is within the scope of the invention to mount the wheels so that alternating wheels are aligned.

The former arrangement is advantageous because it facilitates turning and allows easy removal of wheels.

Attached to harrow 200, rearward of the direction H of travel of harrow 200, there is provided a coupler 205 to which is attached an axle 201 on which there is mounted, a number of spaced and staggered wheel members 40. Thus, once land has been treated with harrow 200 it is impressed using members 40 so as to create, rearward of members 40, a number of land impressions 202.

It will be understood that the invention can be applied to any piece of agricultural machinery where there is a desire and an advantage to be gained from impressing land in accordance with the invention. Such machinery may include:

potato bed cultivators;
potato bed planters;
root crop drills;
cereal drills;
powered harrows;
tined cultivators; and
disc cultivators.

Some of the benefits a farmer can expect by using the apparatus in accordance with the invention are as follows:

1. Reduction of erosion in bare land;

2. Reduction of erosion in cereals, sugar beet and potatoes;
3. Reduce pollution by fertilizer and herbicides by leaching and run-off;
4. More efficient use of limited water supplies;
5. Blockages eliminated when replacing crumble rollers;
6. Quicker and more even drying of the soil surface due to larger surface area;
7. No problem of furrow press transport; and
8. Total area of plough land can be pressed.

Further, the apparatus in accordance with the invention provides a land management technique including a number of soil surface recesses and is particularly advantageous in bare land situations where:

1. Rain fall is low;
2. Irrigation water is limited;
3. Land is in a "nitrate sensitive area";
4. Erosion can cause pollution;
5. Soil surface is "capped";
6. Crumble rollers are liable to blockages;
7. Ploughing and pressing are integral parts of the farmer's programme; and
8. Ploughing or pressing or sowing is practised.

The invention thus provides the unique opportunity for arable farmers, at least, to make better use of resources and reduce detrimental impact on the environment, whilst at the same time increasing efficiency.

It can therefore be seen that the invention provides for a means of efficiently, and cost effectively, creating land impressions which are agriculturally desirable.

I claim:

1. A land and road worthy apparatus used in land management comprising: driving means for moving the apparatus over land; and at least one generally annular wheel member on which said apparatus, at least in part, travels, said member adapted to be self cleaning when traveling on said land and which further includes a generally annular notched peripheral rim including a plurality of spaced-apart peripheral ridge members transversely-extending across substantially the entire width of said peripheral rim separated by relatively deep trough-like valleys transversely-extending across substantially the entire width of said peripheral rim, said ridge members being sized and shaped so as to compact the land and provide for the creation of a series of spaced-apart relatively deep irrigation pools when the apparatus moves over land whose size and shape and position correspond to the size and shape and directions of travel of said ridge members on the periphery of said wheel member.

2. An apparatus according to claim 1 wherein said wheel member is mounted on a single axle the number and nature of said members is varied according to a user's requirements.

3. An apparatus according to claim 2 wherein said members are releasably mounted.

4. An apparatus according to claim 2 wherein said members are mounted so that the spacing between same is adapted to be varied.

5. An apparatus according to claim 1 wherein said members are provided with an outer resilient material which aids cleaning.

6. An apparatus according to claim 5 wherein said material is rubber.

7. An apparatus according to claim 1 wherein the number and nature of said ridges are such that at least 50% of the land surface is impressed by the apparatus.

8. An apparatus according to claim 1, wherein the sides of said ridge members are small relative to the size of conventional wheels on agricultural equipment whereby said wheels are substantially supported, on a level plane, by the ground adjacent recesses created by said ridges.

9. An apparatus according to claim 1 wherein the sides of said ridges are angled to define a generally V-shaped profile.

10. An apparatus according to claim 1 wherein at least half of the surface area of said wheel member is occupied by said ridges.

11. An apparatus according to claim 1 wherein the spacings between said ridges on said wheel member are equal.

12. A drum member for use in an apparatus according to claim 1.

13. A land and road worthy apparatus for use in land management comprising: driving means for moving the apparatus over the land; and a plurality of wheel members on which said apparatus, at least in part, travels, said wheel members adapted to be self-cleaning when traveling on said land and which further includes a generally annular notched peripheral rim including a plurality of spaced-apart peripheral ridge members transversely-extending across substantially the entire width of said peripheral rim separated by relatively deep trough-like valleys transversely-extending across substantially the entire width of said peripheral rim, said ridge members being sized and shaped so as to compact the land and provide for the creation of a series of spaced-apart relatively deep irrigation pools when the apparatus moves over land whose size and shape and position correspond to the size and shape and directions of travel of said ridge members on the periphery of said wheel member, said wheel members further mounted in pairs, each pair on opposite ends of an axle, and wherein opposite wheel members in a single pair have ridges which are staggered with respect to each wheel so as to facilitate turning of the wheel members.

14. An apparatus according to claim 1 wherein said ridge members and said valleys transversely extend completely across said peripheral rim.

* * * * *